June 19, 1945.    H. BEARDSLEY    2,378,459
WEEDING TOOL
Filed July 31, 1944
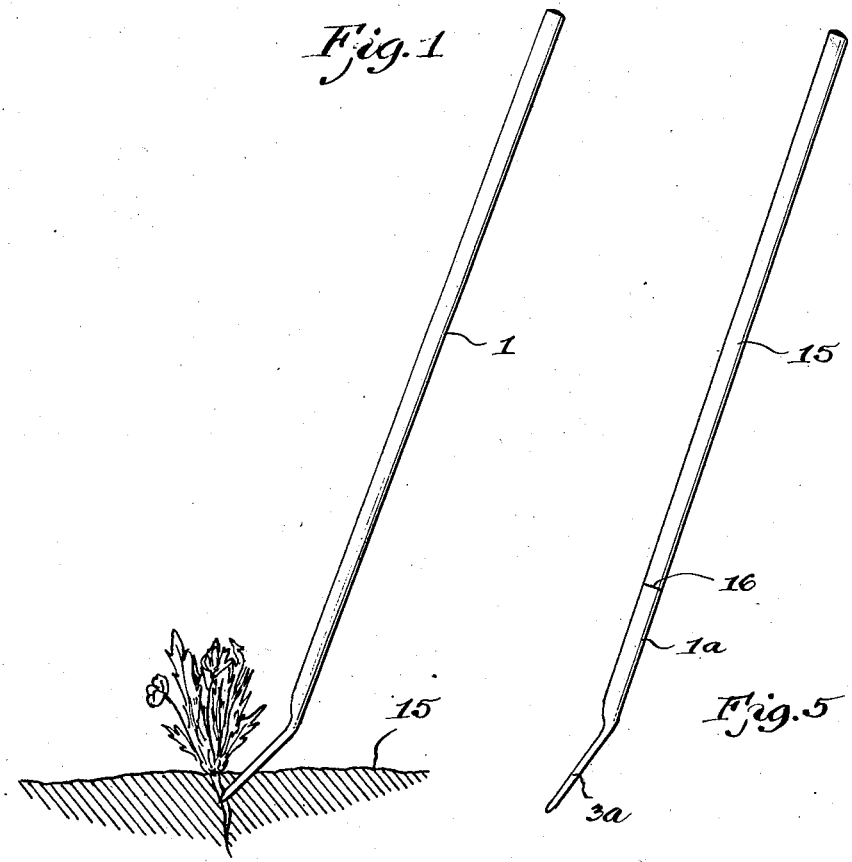
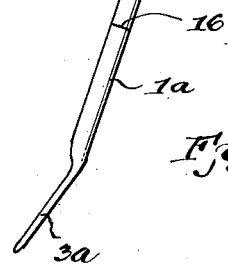
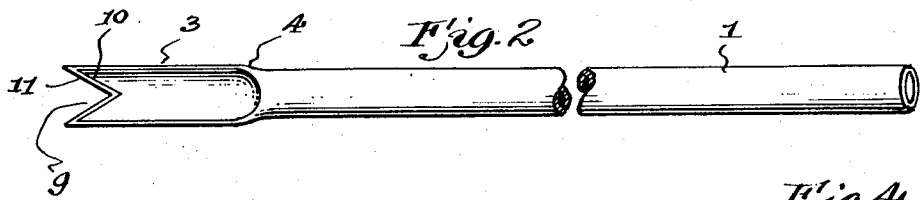
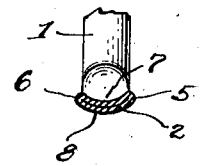
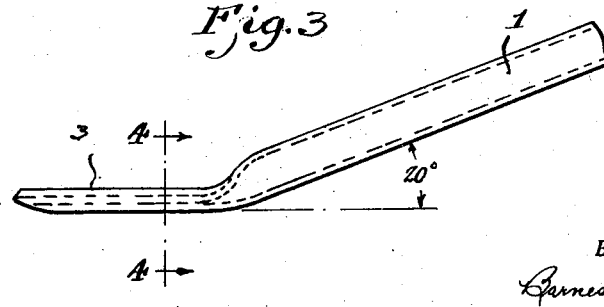
INVENTOR.
Harold Beardsley
BY
Barnes, Kisselle, Laughlin & Raisch
Attorneys.

Patented June 19, 1945

2,378,459

UNITED STATES PATENT OFFICE 2,378,459

WEEDING TOOL

Harold Beardsley, Detroit, Mich., assignor to Michigan Steel Tube Products Co., Detroit, Mich., a corporation of Michigan Application July 31, 1944, Serial No. 547,400

4 Claims. (Cl. 254—132)

This invention relates to a tool for removing or extracting undesirable growth, such as weeds, and has to do particularly to a weeding tool of novel construction which embodies a tubular formation.

The general objects of the invention include that of providing a weed extractor which can be made entirely from tubular stock. By suitable fashioning of one end of the tubular stock, the ground penetrating or working portion of the tube is provided and the remaining length of tube constitutes the handle or a portion of the handle. The handle may be made in such full length that the weeder may be used by a person in a standing position. The handle may be shortened if a shorter tool is desired and also the handle of tubular structure may be made relatively short and lengthened by a suitable extension of wood or other material.

In the manufacture of tubing or pipe reference is made particularly to tubing made from strip stock where the strip is fashioned into tubular form from coils and the edges welded together.

There is a certain percentage of this tubing that is not long enough to make the customer's specified sizes. There is a certain amount of tubing where the gauge or the diameter is outside of the limits on account of variation and thickness of steel. There are certain sizes of tube where the tube is in quantity excess of the customer's requirements. The tube falling into the cassifications as mentioned above is usually transferred to the warehouse stock and disposition of this material is delayed until a customer is found before this material can be disposed. Whereas, the application of this tube can be made into the article covered by the present invention which aims to provide a weeding tool which can be made from the foregoing classification of tubing, and thus the value of the material can be, to a very large extent if not fully, at once retrieved. Not only the metal itself is saved but the workmanship and manufacturing expense put into the off size and short tube is saved at the same time a valuable tool is provided.

The drawing shows a weeding tool for carrying out the invention.

Fig. 1 is a view of a weeding tool made in accordance with the invention and illustrating substantially its manner of application in use.

Fig. 2 is a plan view with the handle broken away for shortening of the view.

Fig. 3 is a partial side elevation of the working end of the tool.

Fig. 4 is a cross sectional view taken substantially on line 4—4 of Fig. 3.

Fig. 5 is a view showing a modified form.

As shown in Fig. 1, the tool comprises a length of tubing which may be considered the handle, as shown at 1. The tube may be first cut into a proper length, and where a tool is desired which can be used by a person in standing position, the handle may be about three feet long. The working portion or digging portion may be about three inches long.

The working portion of the tool is provided by flattening the end of the tube so that the opposite walls of the tube lie flush against each other, as shown at 2 in Fig. 4. This flattening of the tube, of course, widens the working end of the tool to an extent greater than the outside diameter of the tube, as shown in Fig. 2, where the working end is illustrated generally at 3. This flattening of the end of the tube is done so that the shape thereof blends or flows nicely into the handle portion of the tool, as shown at 4, thereby eliminating sharp corners or bends which might weaken the construction.

In this flattening end of the tube, the metal has two folds which constitute the sides of the working portion, as shown at 5 and 6.

In providing the working portion of the tube, it is fashioned preferably so that the upper or face side is concave or of recess construction, as shown at 7, whereas the under or back side is convex, as shown at 8. The extreme end of the tube is provided with a notch 9, which advantageously may be of V-shape, and in cutting out the notch the metal is preferably cut at an angle to thus provide a sort of bevelled edge 10 with a relatively sharp cutting edge 11. The formation of the working end of the tube may be provided by simple operations, as by means of a press and a cutting die.

It has been found that the angle between the working end of the tool and the handle is an important factor from the standpoint of efficient use. Accordingly, a bend is placed in the tool substantially at the juncture between the handle 1 and the working portion 3, as shown in Fig. 3. This bend is preferably such that the angle between the two portions is about 20°, as illustrated in Fig. 3. While this is the preferred angle, the angularity may vary within a suitable range, but for an efficient tool this angle should be within the range of 15° to 25°.

The use of the tool is demonstrated in Fig. 1, although it is to be understood that individual users may handle the tool in different ways.

While in a standing position, the operator may place the tool on the ground in about the position shown in Fig. 1, the ground line being illustrated at 15 so that the working portion of the tool is adjacent a weed or other growth to be cut or extracted. The working portion is then pushed into the ground. This action is facilitated because of the relatively narrow construction of the end 3 of the tool and because of the sharpened edges of the V-notch. The notch is positioned so that the opposite sides of the V substantially embrace opposite sides of the root of the weed, as shown. The tool may be pushed into the ground at an angle so as to engage and cut the root, and then by a leverage action caused by depressing the handle, the weed and its root, or a portion thereof, is elevated and extracted. Some users may prefer to force the tool into the ground so as to not cut the root of the weed, so that when the handle is forced downwardly the entire root is elevated and extracted.

It is to be understood that the length of the handle may vary. In some instances a short handle may be provided so that the tool may be used in the nature of a dibble.

In the modified form shown in Fig. 5, the tool is made from a relatively short piece of tube having the working portion 3a and the handle portion 1a, while the main body of the handle may be of material other than tube, such as wood or the like, as shown at 15. The wood section and the handle section 1a may be suitably joined, for example, at about the joint 16.

I claim:

1. A weeding tool comprising a single length of tube, the major part of the length of tube constituting a handle portion, one end of the tube being flattened and the flattened end constituting a working portion, the upper or face side of the working portion being transversely concave and the lower or back side being transversely convex, the free end of the working portion having a notch therein adapted to engage a root of a weed or the like when projected in the ground.

2. A weeding tool comprising a length of tube, one end of the tube being flattened and constituting a working portion, the remaining part of the tube constituting a handle portion, the upper or face side of the working portion being transversely concave and the lower or back side being transversely convex, the free end of the working portion having a notch therein defined by relatively sharp cutting edges, the working portion being substantially straight in a lengthwise direction and disposed angularly at about 15° to 25° relative to the handle portion.

3. A weeding tool comprising a length of tube, one end of the tube being flattened and constituting a working portion, the remaining part of the tube constituting a handle portion, the upper or face side of the working portion being transversely concave and the lower or back side being transversely convex, the free end of the working portion having a notch therein adapted to engage a root of a weed or the like when projected into the ground.

4. A weeding tool comprising, a single length of tube, the major part of the length of the tube constituting a handle portion, one end of the tube being flattened so that portions of the tube wall lie flush against each other, the flattened part constituting a working portion, the upper or face side of the working portion being transversely concave and the lower or back side being transversely convex, the free end of the working portion having a notch therein defined by relatively sharp cutting edges, the working portion being substantially straight in a lengthwise direction and disposed angularly about 15° to 25° relative to the handle portion.

HAROLD BEARDSLEY.